(12) United States Patent
Chang

(10) Patent No.: US 8,820,920 B2
(45) Date of Patent: Sep. 2, 2014

(54) EYEGLASS FRAME SECUREMENT APPARATUS

(71) Applicant: Wang Lee Chen Chang, Rende Township, Tainan County (TW)

(72) Inventor: Wang Lee Chen Chang, Rende Township, Tainan County (TW)

(73) Assignee: Jiann Lih Optical Co., Ltd., Tainan County (TW)

( * ) Notice: Subject to any disclaimer, the term of this patent is extended or adjusted under 35 U.S.C. 154(b) by 179 days.

(21) Appl. No.: 13/655,493

(22) Filed: Oct. 19, 2012

(65) Prior Publication Data

US 2014/0111762 A1    Apr. 24, 2014

(51) Int. Cl.
*G02C 5/00* (2006.01)

(52) U.S. Cl.
CPC ...................................... *G02C 5/006* (2013.01)
USPC ................................................ 351/96; 351/92

(58) Field of Classification Search
CPC ............ G02C 3/00; G02C 5/00; G02C 5/006; G02C 2200/06; G02C 2200/08
USPC .................... 351/41–158; 2/13, 426, 431, 432
See application file for complete search history.

(56) References Cited

U.S. PATENT DOCUMENTS

| 4,240,718 A * | 12/1980 | Wichers | 351/62 |
| 4,981,350 A * | 1/1991 | Vitaloni | 351/52 |
| 5,098,180 A * | 3/1992 | Tobey | 351/97 |
| 2005/0151925 A1 * | 7/2005 | Chen | 351/90 |

* cited by examiner

*Primary Examiner* — Darryl J Collins
*Assistant Examiner* — Gary O'Neill
(74) *Attorney, Agent, or Firm* — Alan Kamrath; Kamrath IP Lawfirm, P.A.

(57) ABSTRACT

The present invention provides an eyeglass frame securement apparatus comprising an eyeglass frame with upper and lower frames for eyeglasses to be mounted thereon, two outer sides of said upper and lower frames attached to eyeglass temples, a protection strip frame locked into inner circumference of said eyeglass frame; protruding pins extending forward and rearward from a center of the lower frame pivotally attached to the upper frame; a rib extending from outer sides of the upper frame and inserted into grooves to restrict the eyeglasses; protrusions on upper end of supporting shaft of the eyeglass temples inserted into the spaces on the outer side of said lower fame. Therefore, once the upper frame is completely assembled, said eyeglass temples can be outwardly bent to allow said protrusions on the upper end thereof to extend outward from the horizontal hole of the upper frame to restrict said eyeglass temples directionally.

5 Claims, 9 Drawing Sheets

EYEGLASS FRAME SECUREMENT APPARATUS

BACKGROUND OF THE INVENTION

1. Technical Field

The present invention is related to an eyeglass frame securement apparatus mainly for restricting components of the eyeglass frame having predetermined functional eyeglasses attached thereon such that the eyeglasses mounted thereon is ensured to be retained of a firm restriction and even after numerous repeated disassemblies and assemblies, the eyeglasses can still be firmly secured with directional restrictions.

2. Description of Related Art

Currently, there are various types of eyeglass sets designed for various applications and usages, which mostly adapt the configuration of an eyeglass set having functional eyeglasses being replaceably attached onto an eyeglass frame as well as eyeglass temples or restraining band attached on two sides of the eyeglass frame in order to facilitate convenient an fast replacement thereof for users depending on their uses.

The present invention is mainly directed to an eyeglass frame with predetermined functional eyeglasses attached thereon, capable of applying upward and downward directional restrictions to the eyeglasses by ways of easy locking securement thereof and such that the restriction between the eyeglasses mounted onto the eyeglass frame and the eyeglass frame can be maintained. However, as such locking type of eyeglass securement would likely to lead to a greater gap between the eyeglass frame and the eyeglasses after a significant period of time of replacement of the eyeglasses, the eyeglasses would eventually become loose under a normal completion of locking securement thereon.

SUMMARY OF THE INVENTION

The present invention seeks to improve and overcome the existing problems known to be associated with the directional restriction of eyeglass frame attached with a predetermined functional eyeglasses thereon such that the component restriction of the eyeglass frame with the functional eyeglasses mounted thereon can be improved by allowing the upper end of the eyeglass frame can be upward lifted or downward closed to lock into the corresponding lower space of the eyeglass frame. Therefore, the eyeglasses mounted onto the eyeglass frame can be firmly restricted, and even after a significant number of repeated disassemblies and assemblies, the eyeglasses can still be maintained of a firm directional restriction.

A primary objective of the present invention is to provide an eyeglass frame securement apparatus comprising an eyeglass frame with functional eyeglasses and comprising an upper frame and a lower frame provided for said functional eyeglasses to be mounted thereon, two outer sides of said upper and lower frames directionally attached to an eyeglass temple respectively, a protection strip frame locked onto an inner circumference of said eyeglass frame formed by said upper and lower frames, assembled altogether to formed a eyeglass assembly; protruding pins extending forward and rearward from a central portion of said lower frame of said eyeglass frame, grooves formed at two outer sections of said lower frame and having a narrow outer side and a wide inner side, and a space formed separately and adjacent to an outer side of said grooves of said lower frame; a space and a perforation concavely formed rearward at an inner side of said upper frame for said protruding pins extending forward and rearward from said central portion of said lower frame to be correspondingly inserted therein, a rib portion extending downward from an outer side of said upper frame and inserted correspondingly between said grooves on said two outer sides of said lower frame, a horizontal hole penetrating through an inner surface of an outer side of said upper frame; a supporting shaft extending from a functional end of said eyeglass temple, and a protrusion provided on an upper end of said supporting shaft, said supporting shaft of said functional end of said eyeglass temple being inserted into said outer space of said lower frame, said protrusion of said upper end of said supporting shaft horizontally abutting said inner surface of said lower frame; and said rib portion on said outer side of said upper frame pivotally attached to said protrusion at said central portion of said lower frame being correspondingly locked into said grooves on said outer side of said lower frame, said eyeglass temple being outwardly bent such that said protrusion on said upper end of said supporting shaft of said functional end protrudes outward to said horizontal hole on said outer side of said upper frame in order to restrict said eyeglass temple directionally.

A second objective of the present invention is to provide an eyeglass frame securement apparatus further comprising hooks formed of cut-outs facing inward being provided on two sides corresponding to a central section of said protection strip frame locked onto said inner circumference of said eyeglass frame having said upper and lower frames, hooks formed of cut-outs facing outward being provided on two outer sides of said protection strip frame, a space provided for said two hooks of said central section of said protection strip frame to be locked into a corresponding portion of said lower frame, a space provided for said two outer hooks of said protection strip frame to be locked into a corresponding section of said lower frame, whereby a securement between said eyeglass frame and said protection strip frame is ensured.

A third object of the present invention is to provide an eyeglass frame securement apparatus, wherein a surface facing downward of said upper frame of said eyeglass frame comprising said upper and lower frames provided for said functional eyeglasses to be mounted thereon comprises a concave slot, and a surface facing forward of said lower frame comprises a protruding edge frame extending outward therefrom, whereby said functional eyeglasses is firmly inserted therein.

A fourth objective of the present invention is to provide an eyeglass frame securement apparatus, wherein said eyeglass temple respectively provided on said two outer sides of said eyeglass frame comprising said upper and lower frames is further attached and replaced by a restraining band having stitched temples on two ends thereof.

A fifth objective of the present invention is to provide an eyeglass frame securement apparatus, wherein said functional eyeglasses mounted on said eyeglass frame comprising said upper and lower frames comprise a predetermined cut-out formed on a top of an inner side thereof to directionally and firmly abut said protruding pins extending forward and rearward on said central portion of said lower frame.

DESCRIPTION OF EMBODIMENTS OF THE INVENTION

Figure 1:
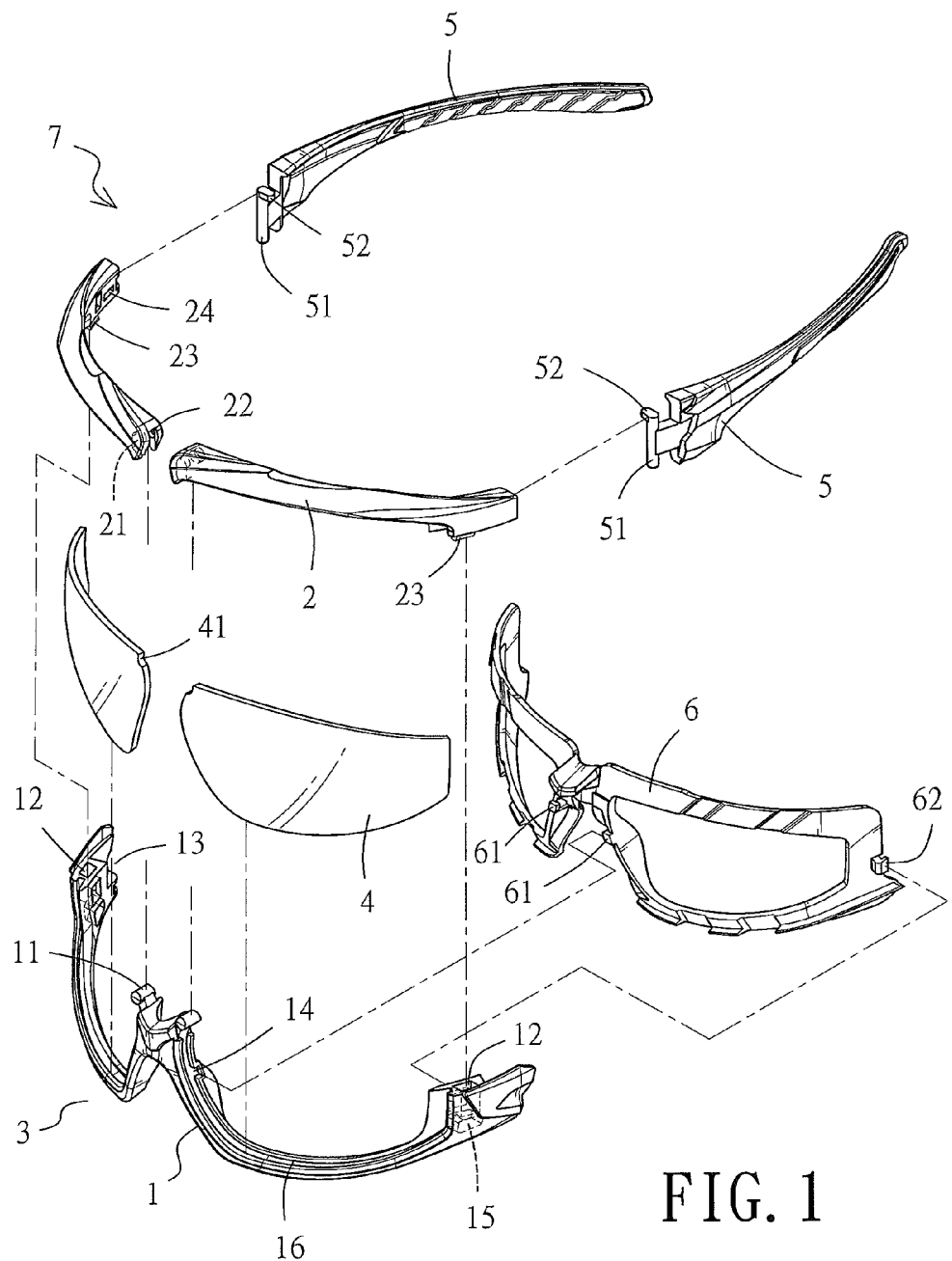
FIG. 1 is an exploded view of the eyeglass assembly of the present invention.

As shown in FIG. 1, the present invention provides an eyeglass frame securement apparatus comprising an eyeglass frame 3 with functional eyeglasses 4 and comprising an upper frame 2 and a lower frame 1 provided for said functional eyeglasses 4 to be mounted thereon, two outer sides of said upper and lower frames 2, 1 directionally attached to an eyeglass temple 5 respectively, a protection strip frame 6 locked onto an inner circumference of said eyeglass frame 3 formed by said upper and lower frames 2, 1, assembled altogether to formed a eyeglass assembly 7, which also includes the following features.

Figure 4:
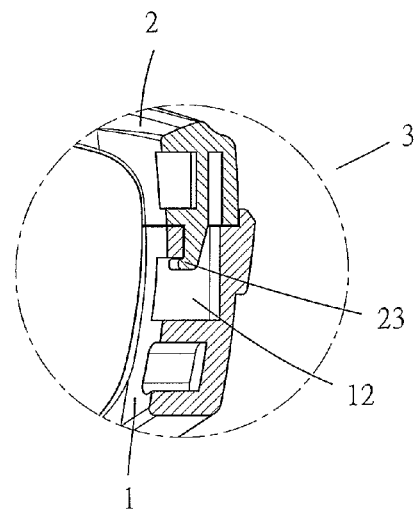
FIG. 4 is an enlarged view of area 40 in FIG. 3.

Protruding pins 11 extend forward and rearward from a central portion of said lower frame 1 of said eyeglass frame, and as shown in FIG. 4, grooves 12 are formed at two outer sections of said lower frame 1 and having a narrow outer side and a wide inner side. In addition, as shown in FIG. 1, a space 13 is formed separately and adjacent to an outer side of said grooves 12 of said lower frame 1. Also, spaces 14, 15 are respectively formed at predetermined portions on two sides of a central section of said lower frame 1 and at the inner surface adjacent to an outer side thereof, and a protruding edge frame 16 extends outward from a surface facing forward of the lower frame 1.

Figure 2:
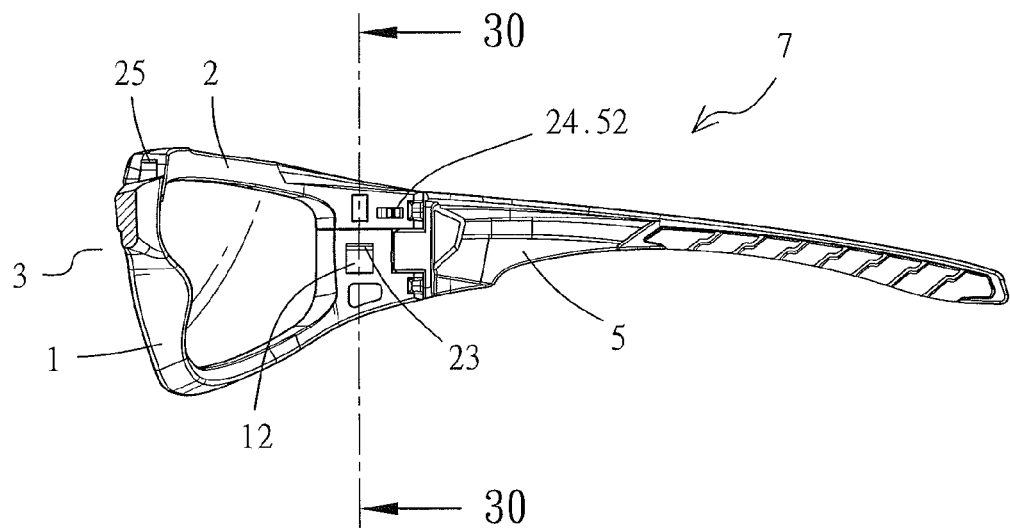
FIG. 2 is a lateral cross sectional view of the eyeglass assembly of the present invention (without the protection strip frame attached thereon)

A space 21 and a perforation 22 are concavely formed rearward at an inner side of said upper frame 2, and a rib portion 23 extends downward from an outer side of said upper frame 2. In addition, a horizontal hole 24 penetrates through an inner surface of an outer side of said upper frame 2, and slots 25 are concavely formed on a surface facing downward of said upper frame 2, as shown in FIG. 2.

Said eyeglasses 4 are functional eyeglasses configured to be of shapes corresponding to the ones of the upper and lower frames 2, 1, and a predetermined cut-out 41 is formed on a top of an inner side of the eyeglasses 4 to directionally and firmly abut the protruding pins 11 extending forward and rearward on said central portion of said lower frame 1.

Furthermore, a supporting shaft 51 extends from a functional end of said eyeglass temple 5, and a protrusion 52 is provided on an upper end of said supporting shaft 51.

Said protection strip frame 6 is a resilient protective strip component configured to be of a shape corresponding to the ones of the upper and lower frames 2, 1 of the eyeglass frame 3; wherein hooks 61 formed of cut-outs facing inward are provided on two sides corresponding to a central section; and wherein hooks 62 formed of cut-outs facing outward are also provided on two outer sides of said protection strip frame 6.

Figure 3:
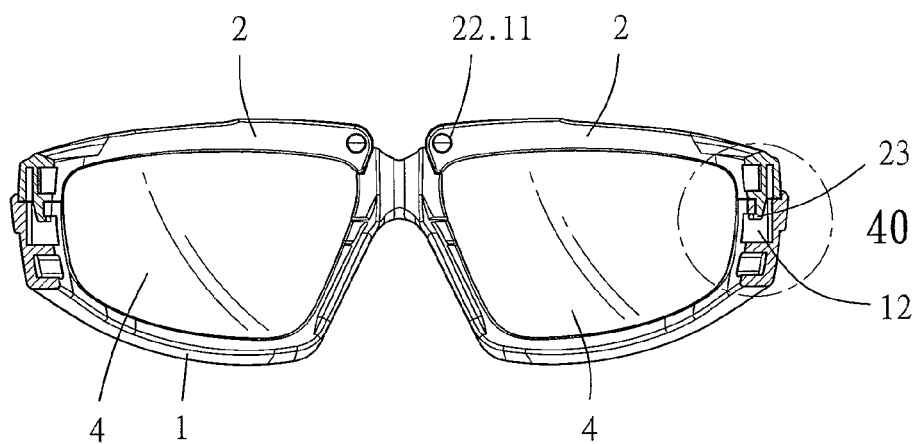
FIG. 3 is cross sectional view along the line 30-30 in FIG. 2.
Figure 5:
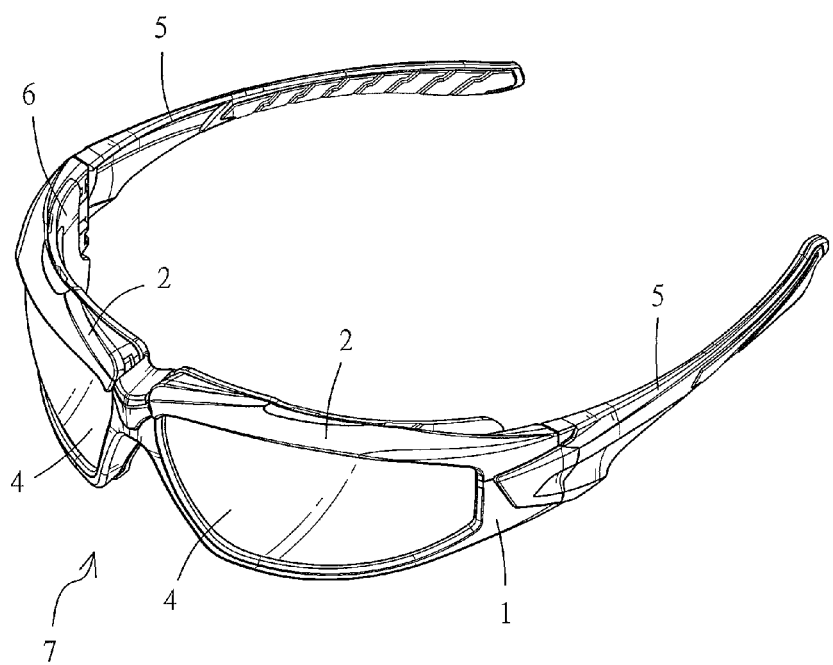
FIG. 5 is a perspective view of the eyeglass assembly of the present invention.
Figure 7:
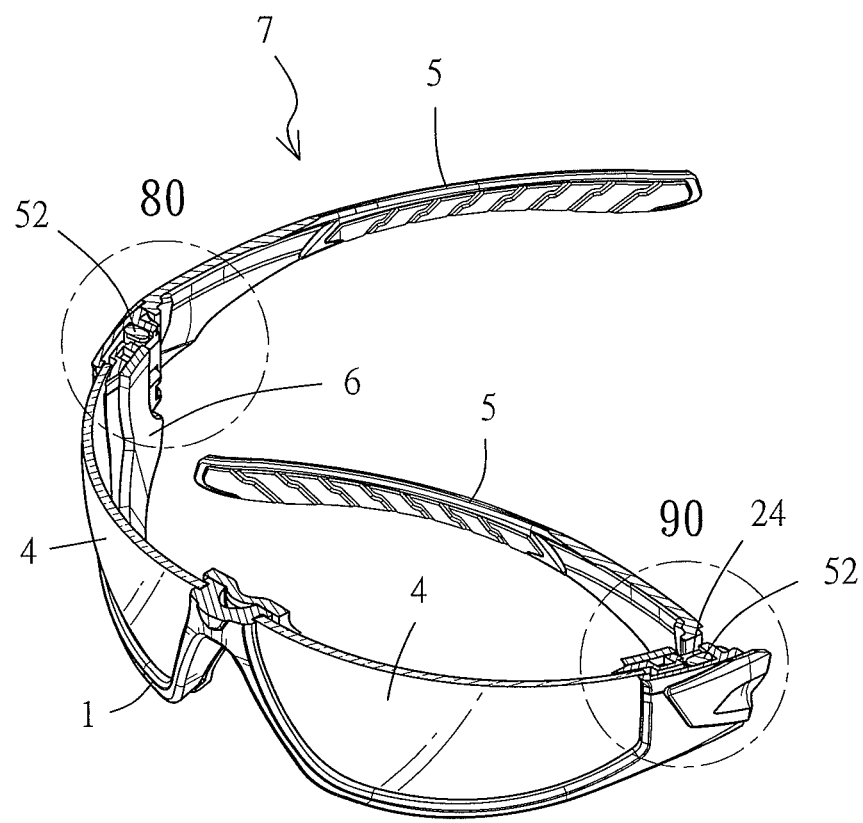
FIG. 7 is an upper sectional view illustrating the eyeglasses being retrieved from the eyeglass assembly of the present invention.
Figure 8:
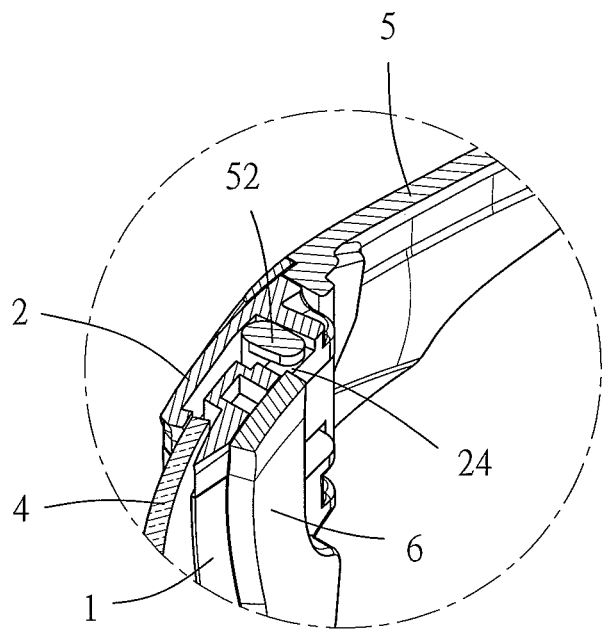
FIG. 8 is an enlarged view of area 80 in FIG. 7.

A shown in FIGS. 1 and 3, the assembly process of the abovementioned upper and lower frames 2, 1, eyeglasses 4, eyeglass temples 5 and protection strip frame 6 includes the following steps. Step 1: inserting the front and rear ends of protruding pin 11 at the central portion of the lower frame 1 into the space 21 and the perforation 22 concaved rearward at an inner side of the upper frame 2. Step 2: mounting the eyeglasses 4 onto the protruding edge frame 16 of the lower frame 1 and the slot 25 of the upper frame 2 respectively. Step 3: inserting the supporting shaft 51 on the functional end of the eyeglass temples 5 into the outer space 13 of the lower frame 1 and abutting the protrusion 52 on the upper end of the supporting shaft 51 parallel with the inner surface of the lower frame 1, as shown in FIG. 7 in which the eyeglass temples are directionally bent inward. Step 4: correspondingly locking the rib portion 23 on the outer side of the upper frame 2 pivotally attached to the protruding pins 11 at the central section of the lower frame 1 into the slot 12 on the outer side of the lower frame 1, as shown in FIGS. 3 and 4. Step 5: bending said eyeglass temples 5 outwardly such that said protrusion 52 on said upper end of said supporting shaft 51 of said functional end protrudes outward to said horizontal hole 24 on said outer side of said upper frame 2 in order to restrict said eyeglass temples 5 directionally, as shown in FIGS. 2 and 8. Step 6: locking the two hooks 61 on the central section of the protection strip frame 6 into the space 14 provided at the corresponding portion of the lower frame 1, as shown in FIGS. 1 and 5, and locking the two outer hooks 62 of the protection strip frame 6 into the space 15 provided at the corresponding portion of the lower frame 1 such that the securement between the eyeglass frame 3 and the protection strip frame 6 is ensured and the eyeglass assembly 7 is constructed.

Figure 6:
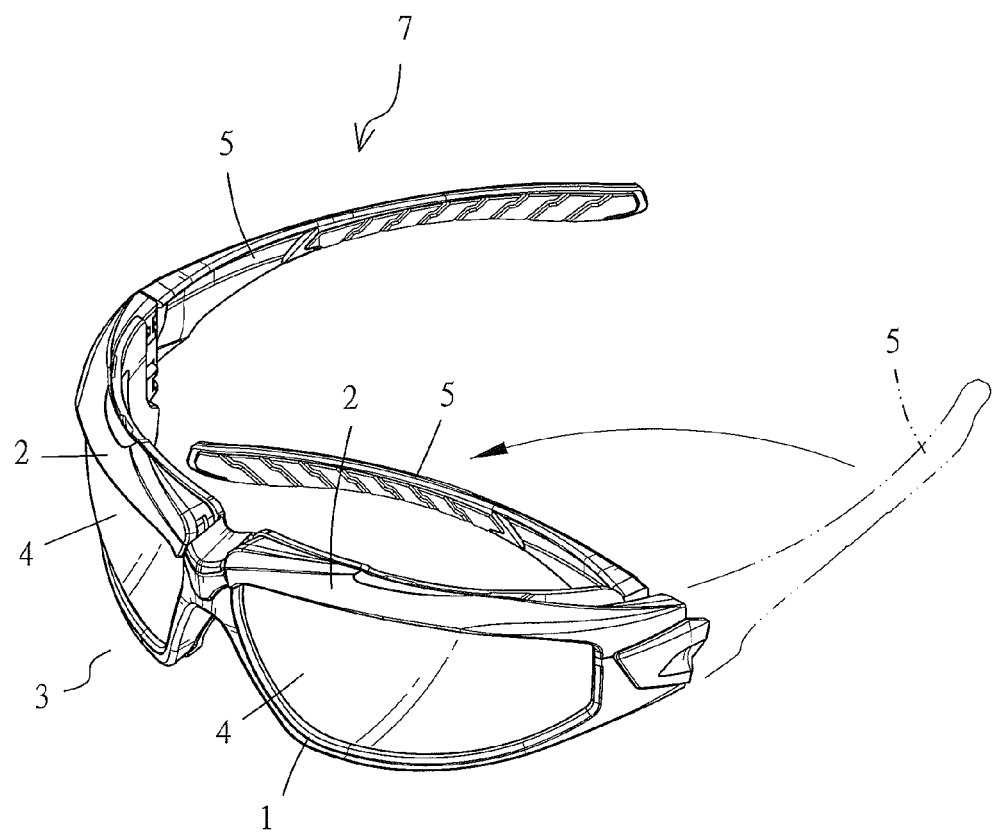
FIG. 6 is an illustration showing the eyeglasses being retrieved from the eyeglass assembly of the present invention.
Figure 9:
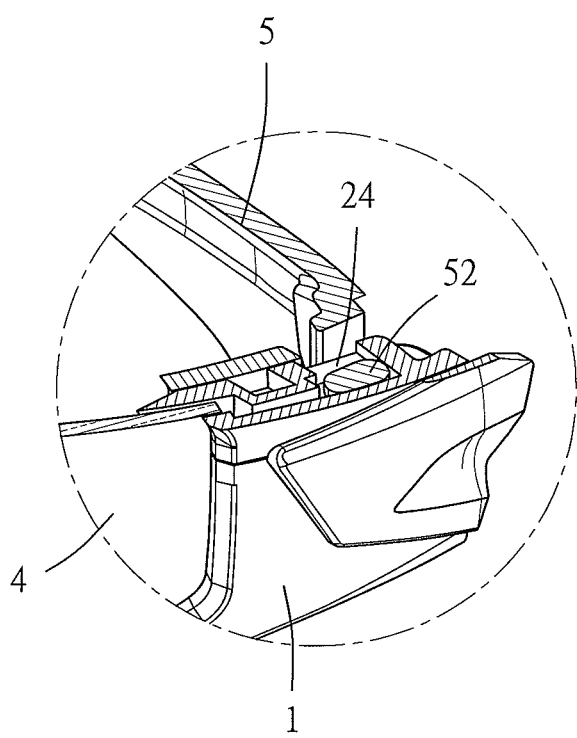
FIG. 9 is an enlarged view of area 90 in FIG. 7.
Figure 10:
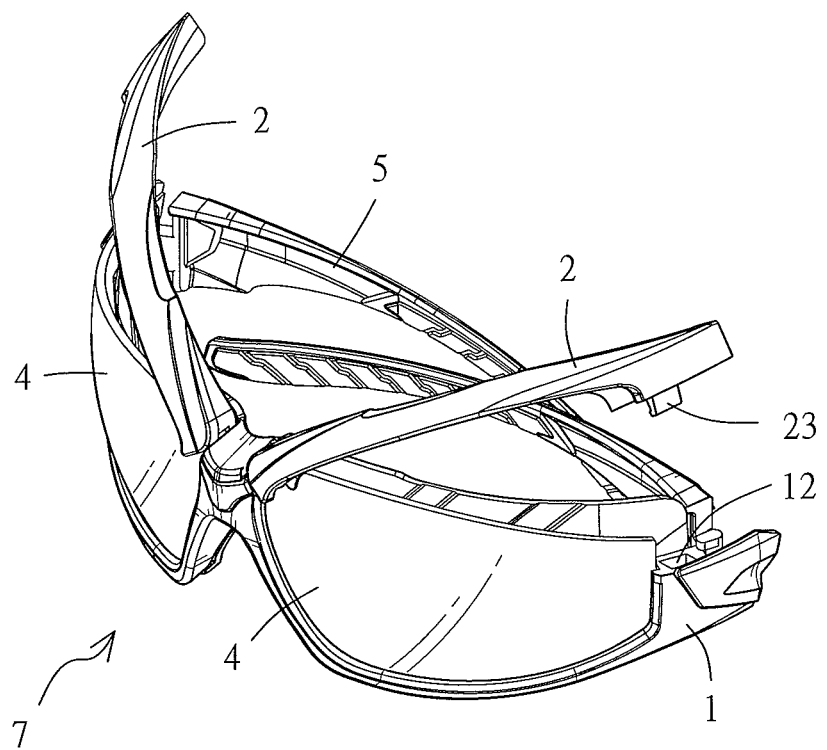
FIG. 10 is a perspective view showing the process of the eyeglasses being retrieved from the eyeglass assembly of the present invention.
Figure 11:
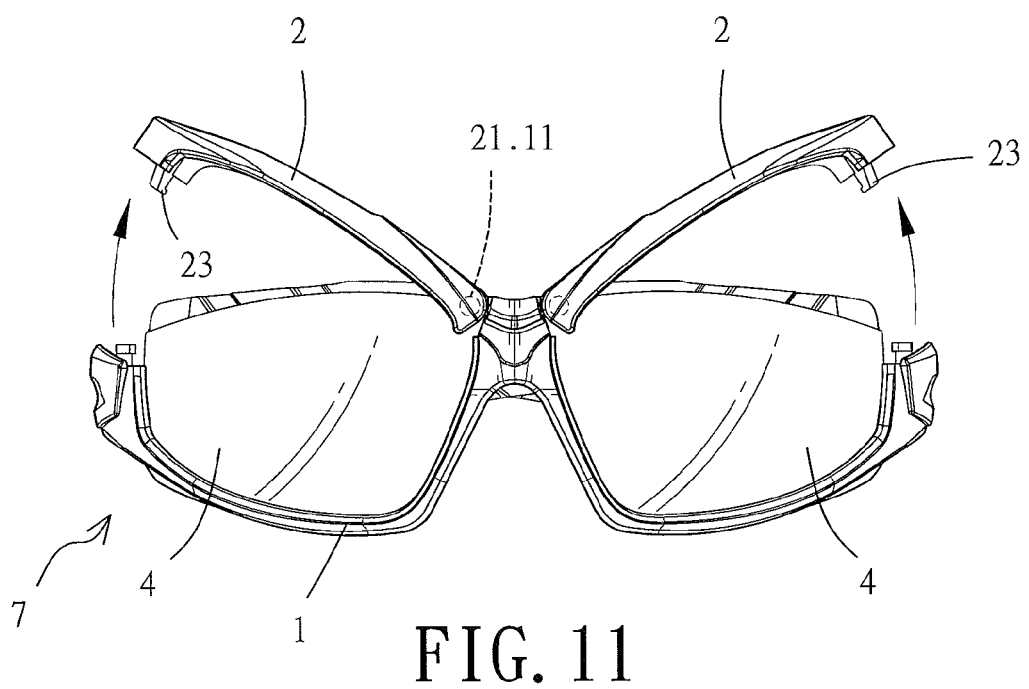
FIG. 11 is a front view showing the process of the eyeglasses being retrieved from the eyeglass assembly of the present invention.

The following is directed to the replacement process of the functional eyeglasses 4 of a completely assembled eyeglass assembly 7, as shown in FIGS. 6 and 7 in which FIG. 7 shows a sectioned upper frame to illustrate the directions of the actions. First, the eyeglass temples 5 are bent inward such that the protrusion 52 on the upper end of the supporting shaft 51 of the functional end of the eyeglass temples 5 disengages from the horizontal hole 24 on the outer side of the upper frame 2, as shown in FIG. 9. Then, the rib portion 23 of the upper frame 2 pivotally attached to the protruding pins 11 at the central portion of the lower frame 1 can be bent upward by hands with external forces to disengage from the slot 12 of the lower frame 1, as shown in FIG. 10. As a result, the upper frame 2 can be upward lifted with the protruding pins 11 at the central portion of the lower frame 1 as the rotation axis thereof, as shown in FIG. 11, in order to allow the functional eyeglasses mounted on the upper and lower frames 2, 1 to be retrieved for necessary replacement of the functional eyeglasses 4. In addition, the upper frame 2 can be moved downward such that the rib portion 23 on the outer side thereof can be locked into the slot 12 of the lower frame 1 again, as shown in FIG. 4, in order to achieve convenient and easy replacement of the functional eyeglasses 4. Therefore, the eyeglasses 4 mounted thereon can be firmly restricted, and even after numerous repeated disassemblies and assemblies of the eyeglasses, they can still be maintained of firm directional restrictions.

Figure 12:
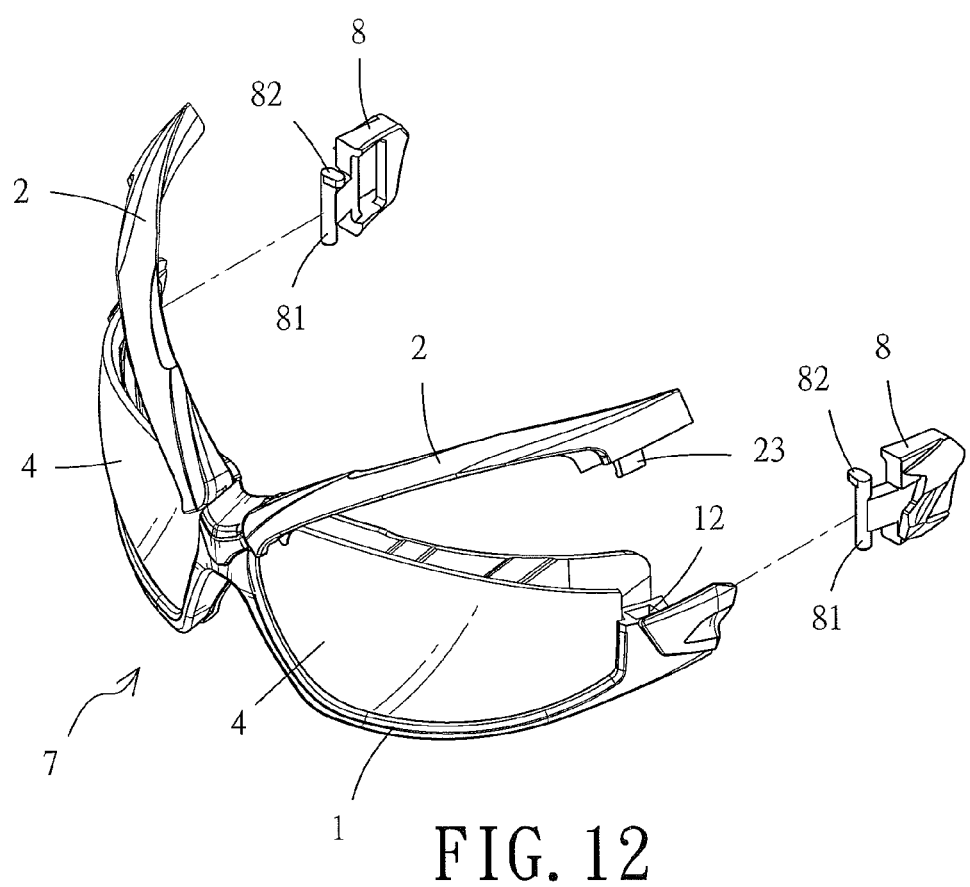
FIG. 12 is an illustration showing the process of replacement of the restraining band of the eyeglass assembly of the present invention.

Furthermore, the eyeglass temples respectively provided on said two outer sides of said eyeglass frame 3 comprising said upper and lower frames 2, 1 can be further attached and replaced by a restraining band having stitched temples 8 on two ends thereof, as shown in FIG. 12. One functional end of the stitched temple 8 can also be extended with a supporting shaft 81 having a protrusion 82 on an upper end thereof, and the other end of the stitched temple 8 can be directionally attached to an end of the restraining band penetrating therethrough.

What is claimed is:

1. An eyeglass frame securement apparatus, comprising: an eyeglass frame with functional eyeglasses and comprising an upper frame and a lower frame provided for said functional eyeglasses to be mounted thereon, two outer sides of said upper and lower frames directionally attached to an eyeglass temple respectively, a protection strip frame locked onto an inner circumference of said eyeglass frame formed by said upper and lower frames, assembled altogether to formed a eyeglass assembly;

protruding pins extending forward and rearward from a central portion of said lower frame of said eyeglass frame, grooves formed at two outer sections of said lower frame and having a narrow outer side and a wide inner side, and a space formed separately and adjacent to an outer side of said grooves of said lower frame;

a space and a perforation concavely formed rearward at an inner side of said upper frame for said protruding pins extending forward and rearward from said central portion of said lower frame to be correspondingly inserted therein, a rib portion extending downward from an outer side of said upper frame and inserted correspondingly between said grooves on said two outer sides of said lower frame, a horizontal hole penetrating through an inner surface of an outer side of said upper frame;

a supporting shaft extending from a functional end of said eyeglass temple, and a protrusion provided on an upper end of said supporting shaft, said supporting shaft of said functional end of said eyeglass temple being inserted into said outer space of said lower frame, said protrusion of said upper end of said supporting shaft horizontally abutting said inner surface of said lower frame; and said rib portion on said outer side of said upper frame pivotally attached to said protrusion at said central portion of said lower frame being correspondingly locked into said grooves on said outer side of said lower frame, said eyeglass temple being outwardly bent such that said protrusion on said upper end of said supporting shaft of said functional end protrudes outward to said horizontal hole on said outer side of said upper frame in order to restrict said eyeglass temple directionally.

2. The eyeglass frame securement apparatus as claimed in claim 1, further comprises hooks formed of cut-outs facing inward provided on two sides corresponding to a central section of said protection strip frame locked onto said inner circumference of said eyeglass frame having said upper and lower frames, hooks formed of cut-outs facing outward being provided on two outer sides of said protection strip frame, a space provided for said two hooks of said central section of said protection strip frame to be locked into a corresponding portion of said lower frame, a space provided for said two outer hooks of said protection strip frame to be locked into a corresponding section of said lower frame, whereby a securement between said eyeglass frame and said protection strip frame is ensured.

3. The eyeglass frame securement apparatus as claimed in claim 1, wherein a surface facing downward of said upper frame of said eyeglass frame comprising said upper and lower frames provided for said functional eyeglasses to be mounted thereon comprises a concave slot, and a surface facing forward of said lower frame comprises a protruding edge frame extending outward therefrom, whereby said functional eyeglasses is firmly inserted therein.

4. The eyeglass frame securement apparatus as claimed in claim 1, wherein said eyeglass temple respectively provided on said two outer sides of said eyeglass frame comprising said upper and lower frames is further attached and replaced by a restraining band having stitched temples on two ends thereof.

5. The eyeglass frame securement apparatus as claimed in claim 1, wherein said functional eyeglasses mounted on said eyeglass frame comprising said upper and lower frames comprise a predetermined cut-out formed on a top of an inner side thereof to directionally and firmly abut said protruding pins extending forward and rearward on said central portion of said lower frame.

* * * * *